June 18, 1968 C. VERGNOLLE 3,389,342

AFC FOR PARAMETRIC AMPLIFIERS AND RADARS

Original Filed Oct. 1, 1963 2 Sheets-Sheet 2

United States Patent Office 3,389,342

Patented June 18, 1968

3,389,342

AFC FOR PARAMETRIC AMPLIFIERS AND RADARS

Claude Vergnolle, Paris, France, assignor to CSF—Compagnie Generale de Telegraphie Sans Fil, a corporation of France Continuation of application Ser. No. 313,037, Oct. 1, 1963. This application Sept. 25, 1967, Ser. No. 670,461
Claims priority, application France, Oct. 2, 1962, 911,019
6 Claims. (Cl. 330—4.5)

ABSTRACT OF THE DISCLOSURE

System for receiving ultra-high frequency signals having a variable carrier frequency and comprising at least one parametric amplifier whose pumping frequency is controlled by a computing device. The frequency control is designed in such a manner that the conversion gain of the parametric amplifier remains as high as possible throughout the received band of frequencies.

This application is a continuation of my copending application Ser. No. 313,037, filed Oct. 1, 1963, now abandoned.

The present invention relates to parametric amplifiers. Such amplifiers have the major advantage of amplifying a signal without introducing excessive noise of their own. However, high gain and low noise figure are obtained only by using circuits with a high Q-factor. As a result, with a fixed pump frequency, any variation of the signal frequency takes the operation outside its optimum conditions and consequently causes a decrease of the signal-to-noise ratio and reduces the gain.

It is an object of the present invention to provide a parametric amplifier which provides a high gain and a high signal-to-noise ratio, and yet is tunable over a wide frequency band.

The parametric amplifier according to the invention is characterized in that, the signal frequency being variable, means are provided for relating the pump frequency, which is no longer fixed, to the signal frequency.

The invention will be better understood from the following description and appended drawings, wherein:

The same reference numbers designate the same elements throughout all the figures.

FIG. 1 shows the circuit diagram of a parametric amplifier. Such amplifiers include a non-linear element C which varies at the pump frequency $f_p=F_p+\Delta f_p$.

Figure 1:
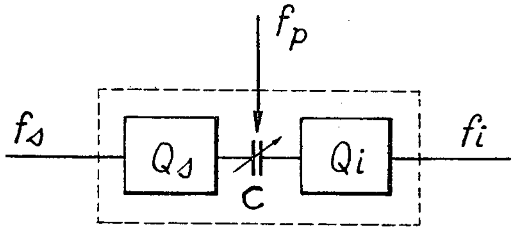
FIG. 1 is a circuit diagram of a known parametric amplifier.

This element couples the input circuit of the signal of frequency $f_s$ and the idler frequency circuit, the frequency of the idler signal being $f_i=nf_p\pm mf_s$. These two circuits are tuned to the central frequencies of the frequency ranges concerned, namely $f_s=F_s\pm\Delta f_s$ and $f_i=F_i\pm\Delta f_i$. To simplify the description, they will be characterized by their respective Q-factors $Q_s$ and $Q_i$.

According to the invention, $f_s$ being variable, $f_p$ is also variable, and the conditions of this variation will be stated, setting:

$$\epsilon_s=\Delta f_s/F_s$$

$$\epsilon_p=\Delta f_s/F_p$$

$$\epsilon_i=\Delta f_i/F_i$$

The non-linear element will be, for example, a capacity which varies under the action of the pump and can be written:

$$C=C_0+\Delta C\cos(2\pi f_p\cdot t)$$

A non-linear inductance or resistance can be used just as well; for example, a ferrite, an Esaky diode near its tunnel current, or at its peak current, can be used.

Calculations will be set out for the most useful case in $f_i$ is made equal to $f_p-f_s$, but the principle would be the same for circuits known in the technique as "up converters."

It is known that the gain of the parametric amplifiers may be written:

$$=Q_s\cdot Q_i\left[\frac{\Delta C}{2C_0}\right]^2$$

The conversion gain, i.e. the ratio of the power collected in the load resistance $R_i$ of the idler circuit to the maximum source power, may be written within an approximation disregarding the second order terms in $\epsilon_s$ and $\epsilon_i$:

$$G=4\frac{F_i}{F_s}\cdot\frac{\alpha}{(1-\alpha)^2+(Q_s\epsilon_s-Q_i\epsilon_i)^2} \qquad (2)$$

The gain at frequency $f_s$ is given by a similar formula. In particular, the denominator is the same in both expressions:

$$G=\frac{(1+\alpha)^2+(Q_s\epsilon_s-Q_i\epsilon_i)^2}{(1-\alpha)^2+(Q_s\epsilon_s-Q_i\epsilon_i)^2} \qquad (2a)$$

These formulae show that the gain is high when $\alpha$ is close to unity, and when:

$$Q_s\epsilon_s-Q_i\epsilon_i=0 \qquad (3)$$

This relation can also be written:

$$\frac{\Delta f_p}{\Delta f_s}=1+\frac{Q_sF_i}{Q_iF_s} \qquad (4)$$

It is seen from this relation that a fixed pump frequency ($\Delta f_p=0$) prevents a maximum conversion gain when $\Delta f_s$ varies; for this to be the case, $\Delta f_p/\Delta f_s$ has to be greater than 1.

A parametric amplifier according to the invention has its pump frequency related to the signal frequency by relation (4).

Figure 2:
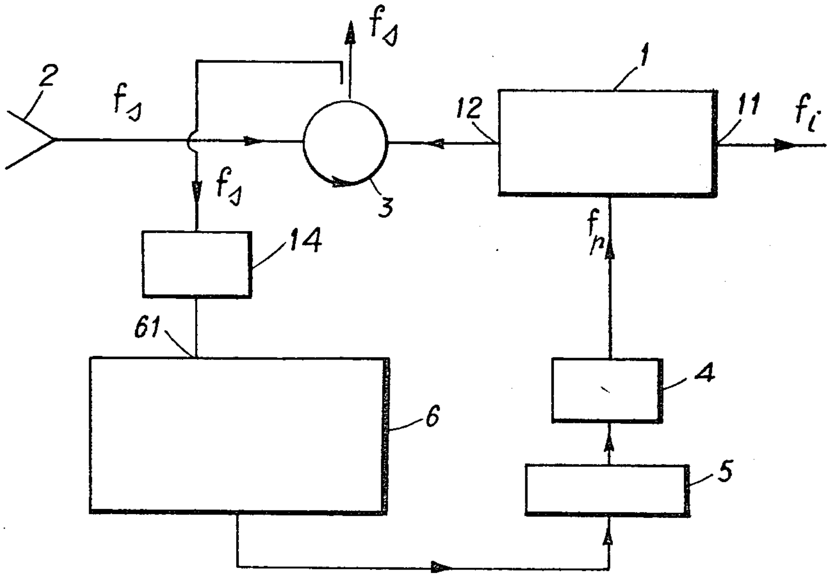
FIG. 2 shows a first embodiment of the invention.

FIG. 2 shows a first embodiment of the invention.

In this figure a parametric amplifier 1 receives from an antenna 2 a signal at frequency $f_s$ through a circulator 3, and delivers at its ouput 11, the idler frequency signal $f_i$, or at its output 12, an amplified signal which is delivered to the receiver (not shown) by circulator 2.

The parametric amplifier 1 receives the pump frequency $f_p$ from a pump oscillator 4. The latter's frequency is not fixed, as in known parametric amplifiers. It may be a "Carcinotron" tube, or any other electronically tuned tube which receives a control voltage from an amplifier 5, which in turn, receives its input voltage from a computer 6.

Computer 6 has its input 61 connected to the output of the parametric amplifier through a wavemeter 14 and receives a voltage proportional to $f_s$. Computer 6 then computes the voltage to be applied through device 5 to oscillator 4, so that frequency $f_p$ should satisfy relation (4) for all variations of the signal frequency $f_s$.

In the case of a receiver of the radar type, the input 61 of the computer can be connected to the radar pilot oscillator, supplying frequency $f_s$.

It may be useful to make the Q-factor $Q_i$ very large as compared to the Q-factor $Q_s$ of the signal circuit.

In the case relation (4) becomes:

$$\Delta f_p\simeq\Delta f_s$$

Figure 3:
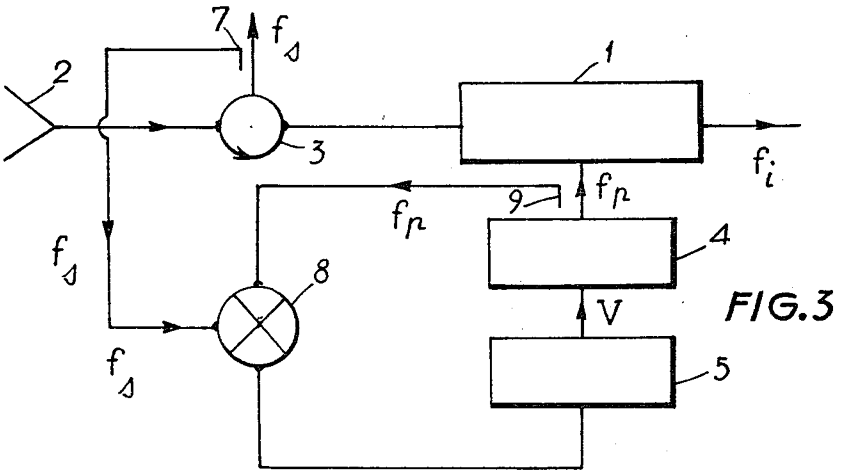
FIGS. 3, 4 and 5 are modifications of the invention.

The arrangement of FIG. 3 is applicable to this case. Computer 6 is no longer used. Its place is taken by a mixer 8 which receives frequency $f_s$, through a directional coupler 7, connected to the output of circulator 3. It also receives frequency $f_p$ from another directional coupler 9 connected to the output of pump oscillator 4.

The difference $f_p - f_s$, obtained at the output of mixer 8 controls a voltage generator 25 which in turn controls oscillator 4. The pump frequency $f_p$ is controlled by the frequency of the signal.

Figures 4, 5:
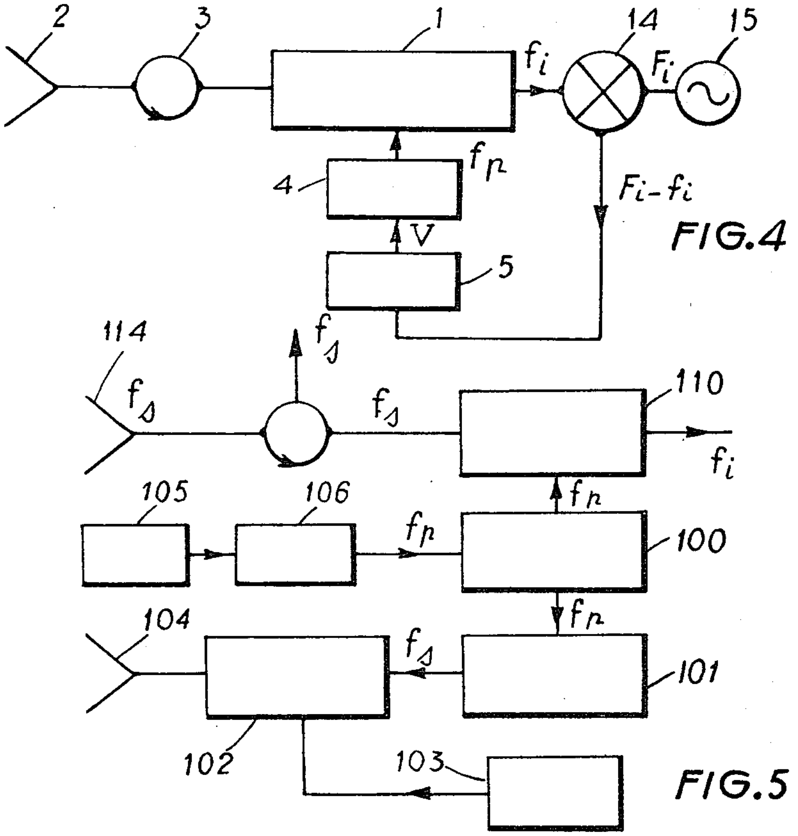

FIG. 4 is a modification of FIG. 3. Frequency $f_i$ is compared, by means of a mixer 14, with a fixed reference frequence $F_i$ supplied by a generator 15. A control voltage derived from the frequency difference $F_i - f_i$ controls the voltage which in turn controls pump 4.

FIG. 5 shows a further modification.

The arrangement of FIG. 5 is based on the following property valid only in the case of negative resistance parametric amplifiers. Such parametric amplifiers can start oscillating when their gain becomes infinite, i.e. when the denominator of Formula 2 becomes zero, i.e. when:

$$\alpha = 1$$

and $$\epsilon_s Q_s - \epsilon_i Q_i = 0$$

In other words, it will oscillate under the action of a pump frequency $f_p$ at frequencies $f_s$ and $f_i$ related to $f_p$ by relation (4).

All that is required is to use sufficient pump power so that $\alpha = 1$.

The arrangement of FIG. 5 is of the radar type using this property.

It includes a pump oscillator 100, supplying a pump signal at frequency $f_p$ to a parametric amplifier 101 and this signal has a sufficiently high level to ensure that amplifier 101 starts oscillating. It will oscillate at frequency $f_s$ related to $f_p$ by relation (4). Oscillator 101 then controls the transmitter 102 which transmits on frequency $f_s$. Power is radiated by antenna 104. Transmitter 102 is pulse modulated by a modulator 103.

The frequency of oscillator 100 is controlled by a generator 106 which is controlled by a device 105.

At the receiver end, the radar includes a parametric amplifier 110, identical to amplifier 101 and also receiving pumping energy at the pump frequency $f_p$. The power level at frequency $f_p$, received by amplifier 110, is insufficient to cause it to oscillate, but provides the required gain.

Amplifier 110 receives by antenna 114 and circulator 115 the power reflected by any object at frequency $f_s$, in response to the radar pulse $f_s$, $f_s$ and $f_p$ being related, through this arrangement, by relation (4). Amplifier 110 will then be at optimum operating conditions.

Of course the invention is not limited to the embodiments shown and described which are given solely by way of example.

What is claimed is:

1. A parametric amplifier having a first input for receiving a signal at a first frequency; a second input; and an output; an oscillator furnishing a signal at a pumping frequency, connected to said second input, and having a control input for varying said pumping frequency; and means, controlled by said signal frequency, connected to said control input for varying said pumping frequency.

2. A receiver for ultra-high-frequency signals comprising in combination: a parametric amplifier having a first input for receiving a signal at a first frequency; a second input; and an output; an oscillator furnishing a signal at a pumping frequency, connected to said second input, and having a control input for varying said pumping frequency; a wavemeter for delivering a first voltage proportional to said signal frequency; computing means for receiving said first voltage, and for delivering an output control voltage; and means for delivering said control voltage to said oscillator control input.

3. A receiver for receiving ultra-high frequency signals, comprising in combination: a parametric amplifier having a first input circuit resonant to the input signal frequency; a second input; an output circuit resonant to an idler frequency, the Q factor of said first input circuit being negligible with respect to the Q factor of said output circuit; a local oscillator, having a frequency control input for generating a pumping frequency; and means for locking said pumping frequency on said input signal frequency.

4. A receiver for receiving ultra-high frequency signals, comprising in combination: a parametric amplifier having a first input circuit, resonant to the input signal frequency; a second circuit; an output circuit resonant to an idler frequency, the Q factor of said first input circuit being negligible with respect to the Q factor of said output circuit; a local oscillator having a frequency control input for generating a pumping frequency; a mixer having first and second inputs for receiving said input signal and said pumping frequency respectively and an output; means for connecting said output to said frequency control input of said oscillator.

5. A receiver for receiving ultra-high frequency signals, comprising in combination: a parametric amplifier; having a first input circuit resonant to the input signal frequency; a second input circuit; an output circuit resonant to an idler frequency, the Q factor of said first input circuit being negligible with respect to the Q factor of said output circuit; a local oscillator having a frequency control input for generating a pumping frequency; a mixer for receiving said pumping frequency and a stabilized frequency, and delivering an output; means for deriving from said output an error control voltage and means for applying said error voltage to said control input of said oscillator.

6. A receiver for ultra-high frequency signals comprising in combination: a parametric amplifier as claimed in claim 1, wherein said frequency varying means comprise: a further parametric amplifier identical to said parametric amplifier and tuning means; said further amplifier having an input coupled to said pumping oscillator and an output supplying an oscillatory signal; said tuning means being coupled to said control input for maintaining said oscillatory signal at synchronism with said received signal.

No references cited.

ROY LAKE, *Primary Examiner.*

D. R. HOSTETTER, *Examiner.*